(12) United States Patent
Senani et al.

(10) Patent No.: US 10,557,040 B2
(45) Date of Patent: Feb. 11, 2020

(54) ANTI-CORROSION COATINGS LOADED WITH MESOSTRUCTURED PARTICLES

(71) Applicants: AIRBUS GROUP SAS, Blagnac (FR); PYLOTE, Dremil Lafage (FR); UNIVERSITE PIERRE ET MARIE CURIE (PARIS 6), Paris (FR); CENTRE NATIONAL DE LA RECHERCHE SCIENTIFIQUE, Paris (FR)

(72) Inventors: Sophie Senani, Paris (FR); Loïc Marchin, Mons (FR); Marie-Laure Desse, Portet sur Garonne (FR); Lionel Nicole, Brunoy (FR); François Ribot, Antony (FR); Alexandre Perrot, Paris (FR)

(73) Assignee: AIRBUS, Blagnac (FR)

( * ) Notice: Subject to any disclaimer, the term of this patent is extended or adjusted under 35 U.S.C. 154(b) by 134 days.

(21) Appl. No.: 15/535,704

(22) PCT Filed: Dec. 14, 2015

(86) PCT No.: PCT/FR2015/053496
§ 371 (c)(1),
(2) Date: Jun. 13, 2017

(87) PCT Pub. No.: WO2016/097570
PCT Pub. Date: Jun. 23, 2016

(65) Prior Publication Data
US 2017/0327695 A1    Nov. 16, 2017

(30) Foreign Application Priority Data
Dec. 15, 2014  (FR) ...................... 14 62409

(51) Int. Cl.
| C08K 13/02 | (2006.01) |
| C09D 5/08 | (2006.01) |
| C09D 7/65 | (2018.01) |
| C09D 7/62 | (2018.01) |
| C09D 7/40 | (2018.01) |

(52) U.S. Cl.
CPC ............... *C09D 5/08* (2013.01); *C08K 13/02* (2013.01); *C09D 5/082* (2013.01); *C09D 7/62* (2018.01); *C09D 7/65* (2018.01); *C09D 7/68* (2018.01); *C09D 7/69* (2018.01)

(58) Field of Classification Search
None
See application file for complete search history.

(56) References Cited

U.S. PATENT DOCUMENTS

2009/0078153 A1 * 3/2009 Shchukin ............... B82Y 30/00
                                                              106/14.44
2011/0236596 A1    9/2011 Skorb et al.

FOREIGN PATENT DOCUMENTS

| DE | 10 2008 003392 A1 | 7/2009 |
| EP | 1 832 629 A1 | 9/2007 |
| WO | 2010/057667 A1 | 5/2010 |

OTHER PUBLICATIONS

He et al., "Self-repairing coating for corrosion protection of aluminum alloys," Progress in Organic Coatings, Apr. 1, 2009, pp. 37-43, vol. 65, No. 1, Elsevier BV, NL.
Chen et al., "An intelligent anticorrosion coating based on pH-responsive supramolecular nanocontainers," Nanotechnology, Nov. 10, 2012, pp. 1-12, vol. 23, No. 50, IOP PUblishing, Bristol, GB.
Sanchez et al., Design, synthesis, and properties of inorganic and hybrid thin films having periodically organized nanoporosity, Chem. Mater., Jan. 17, 2008, pp. 682-737, vol. 20, No. 3, American Chemical Society.
Boissiere et al., "Aerosol Route to Functional Nanostructure Inorganic and Hybrid Porous Materials," Advanced Materials, Feb. 1, 2011, pp. 599-623, vol. 23, No. 5.
Jiang et al., "Controlled Release from Core-Shell Nanoporous Silica Particles for Corrosion Inhibition of Aluminum Alloys," J. Nanomaterials, 2011, pp. 1-10, vol. 2011.
Shchukin et al., Surface-Modified Mesoporous SiO2 Containers for Corrosion Protection, Advanced Functional Materials, Aug. 10, 2009, pp. 2373-1379, vol. 19, issue 15.
Borisova et al., "Mesoporous Silica Nanoparticles for Active Corrosion Protection," ACS Nano, Feb. 23, 2011, pp. 1939-1946, vol. 5, No. 3.
Borisova et al., "Influence of Embedded Nanocontainers on the Efficiency of Active Anticorrosive Coatings for Aluminum Alloys Part I: Influence of Nanocontainer Concentration," ACS Appl. Mater. Interfaces, 2012, pp. 2931-2939, vol. 4, No. 6, American Chemical Society.
Borisova et al., "Influence of Embedded Nanocontainers on the Efficiency of Active Anticorrosive Coatings for Aluminum Alloys Part II: Influence of Nanocontainer Position," ACS Appl. Mater. Interfaces, 2013, pp. 280-287, vol. 5, No. 1, American Chemical Society.
Soler-Illia et al., "New mesostructured hybrid materials made from assemblies of dendrimers and titanium(IV)-oxo-organoclusters," Angew. Chem. Int. Ed., Dec. 1, 2000, pp. 4249-4254, vol. 39, issue 23.

(Continued)

*Primary Examiner* — Sheeba Ahmed
(74) *Attorney, Agent, or Firm* — IM IP Law; Chai Im; C. Andrew Im

(57) ABSTRACT

Coatings, for example polymer coatings or sol-gel coatings, including at least one layer of micrometric, individualised and mesostructured spherical particles. The particles having been created and loaded with at least one element selected from corrosion-inhibiting functional molecules and corrosion-inhibiting functional nano-objects, by a method having non-dissociable nebulization-heating steps that are continuous in a single reactor. The coatings form an anti-corrosion system, having mechanical strength and/or for coloring. The coatings are applicable, in particular, in the field of protecting light aeronautical alloys against corrosion.

12 Claims, 1 Drawing Sheet

(56) References Cited

OTHER PUBLICATIONS

Forster et al., "Amphiphilic Block Copolymers in Structure-Controlled Nanomaterial Hybrids," Adv. Mater., 1998, pp. 195-217, vol. 10, No. 5. 195-217.
Forster et al., "From Self-Organizing Polymers to Nanohybrid and Biomaterials," Angew. Chem. Int. Ed., 2002, pp. 688-714, vol. 41.
Colfen, "Double-Hydrophilic Block Copolymers: Synthesis and Application as Novel Surfactants and Crystal Growth Modifiers," Macromol. Rapid Commun., Feb. 2001, pp. 219-252, vol. 22, issue 4.

\* cited by examiner

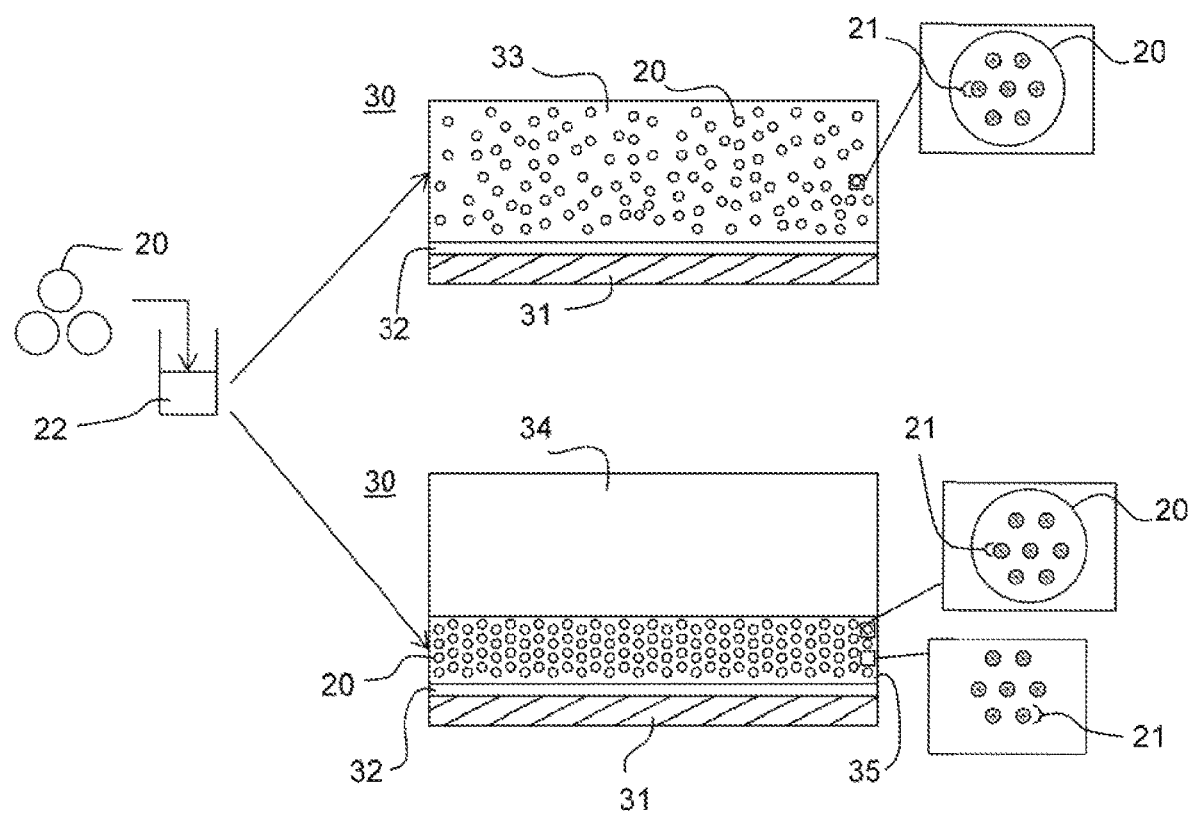

ANTI-CORROSION COATINGS LOADED WITH MESOSTRUCTURED PARTICLES

RELATED APPLICATIONS

This application is a § 371 application from PCT/FR2015/053496 filed Dec. 14, 2015, which claims priority from French Patent Application No. 14 62409 filed Dec. 15, 2014, each of which is incorporated herein by reference in its entirety.

FIELD OF THE INVENTION

The present invention relates to coatings intended to cover aircraft fuselage. These coatings exist to form an anticorrosion system with mechanical strength and/or color.

BACKGROUND OF THE INVENTION

It has been observed that direct incorporation of corrosion-inhibiting functional molecules and/or nano-objects in large quantities in a matrix reduces both the mechanical and barrier properties of the host matrix, leading to insufficient anticorrosion protection for the coating. What is more, this direct incorporation may be incompatible with the chemical nature and inhibition method for certain classes of corrosion inhibitors. Indeed, most organic corrosion inhibitors are chelating/complexing agents for metal ions and inorganic corrosion inhibitors are often salts of metal ions. From this observation, it is clear that mixing these two classes of inhibitors may, in some cases, lead to partial neutralization of the corrosion inhibitors (inorganic corrosion inhibitors complexed by organic corrosion inhibitors). To at least partially remedy the negative effects of direct incorporation of corrosion inhibitors in the coating, the strategy of incorporating corrosion inhibitors in nanomaterials has been studied in recent years. Different types of particles having the function of serving as nano-reservoirs have been tested, such as non-porous $SiO_2$ nanoparticles coated with polyelectrolytes (alternating multiple layers of polymers with opposite charges obtained by layer-by-layer deposit), boehmite nanoparticles, halloysite nanotubes, layered double hydroxides, hydroxyapatite microparticles, or mesoporous nanoparticles of silica coated with polyelectrolytes. However, the use of such particles presents three major drawbacks: the quantity of corrosion inhibitors present in the particles, and therefore in the coating, is limited, the release kinetics for the inhibitors incorporated into the particles are slow and the synthesis of these systems active on corrosion is long and involves a large number of steps, which makes these particles hard to industrialize.

It has been discovered that incorporating corrosion inhibitors indirectly into the coatings, in mesostructured particles, can significantly increase the level of corrosion inhibitors loaded in a coating without altering its macroscopic or microscopic properties.

Two main mesostructuration processes for materials are known. The first mechanism, called liquid crystal templating, involves the prior existence of a liquid-crystal phase before the condensation of inorganic species. The formation of the material then results from the diffusion of inorganic precursors in the inter-micellar spaces in the organic mesophase. The second mechanism relies on the phenomenon of cooperative self-assembly, in which surfactant molecules and inorganic species combine in a first step to form an intermediate hybrid mesophase. By combining sol-gel chemistry (hydrolysis-condensation of inorganic and/or hybrid organic-inorganic precursors) and a liquid-crystal phase (pre- or post-formed), it is therefore possible to develop a material that has periodic-phase nanosegregation that can lead, depending on the mesophases obtained, to the existence within the particles of at least one three-dimensional network that may be inorganic or hybrid organic-inorganic, and where the other phases may be purely organic, hybrid organic-inorganic or inorganic. Materials having such phase nanosegregation are defined as being mesostructured materials.

The use properties for such materials are intimately connected to the porosity release by elimination of the surfactant phase, which is generally obtained from chemical extraction methods or by high-temperature heat treatments (500° C.). Mesostructured materials whose porosity has been released are defined as periodically organized mesoporous materials.

Mesostructured materials synthesized in powder form have most commonly been obtained from methods of synthesis by precipitation. Generally, these need an autoclave curing step that is often long (from 12 to 24 h) and is incompatible with continuous production. What is more, the stoichiometry of the initial solution and the final material may differ if a portion of the reagents is found in the supernatant. Finally, with this technique it is difficult to obtain elemental particles that have a regular shape and size.

An alternative to methods of synthesis by precipitation, less frequently used and relying on the phenomenon of cooperative self-assembly, involves the evaporation of solvents from dilute solutions of reagents. The principle of this method, commonly called evaporation-induced self-assembly (EISA), consists in causing self-assembly of surfactants in the liquid-crystal phase and the condensation of inorganic and/or organic-inorganic hybrid precursors present around micellar aggregates, when the solvents evaporate. From this synthetic strategy in the last decade mesostructured materials have been developed in the form of films, micro-units, membranes, fibers and submicron particles using industrializable, or even industrial, shaping processes.

The synthesis of materials using EISA first involves the development of an aqueous or dilute water-alcohol solution containing the inorganic and/or hybrid precursors, the catalysts and/or inhibitors for hydrolysis-condensation reactions (respectively, in the case of silicic and transition metal oxide precursors), surfactants and the functional molecules and/or nano-objects. This solution may then be deposited on to a substrate either by dip-, spin- or spray-coating to form a film, or sprayed in spherical droplets to obtain spherical particles via the aerosol method. The material then undergoes an evaporation phase at moderate temperatures (less than 250° C.) to allow self-assembly of the surfactants and partial condensation of the inorganic and/or hybrid precursors around micellar aggregates. The material obtained may then undergo a post-treatment that aims to consolidate the inorganic or hybrid phase.

In comparison with the precipitation method, the evaporation method presents several advantages, such as better control of reagent hydrolysis-condensation, controlling stoichiometry for particles equal to that of the stoichiometry in non-volatile species from the initial solution, obtaining more monodispersed spherical particles, synthesizing powder continuously, controlling particle size and mesophase by adjusting the physical and chemical parameters of the solution and the parameters of the aerosol method, the possibility of working with heterogeneous solutions containing (nano) particles for example, or even the possibility of simply making core-shell particles by using double concentric nozzles, the possibility of obtaining much higher loading levels of functional molecules and/or nano-objects and the possibility of working with chemically incompatible compounds through the use of double concentric nozzles.

The Sanchez et al. review (*Design, synthesis, and properties of inorganic and hybrid thin films having periodically organized nanoporosity*, 2008, Chemistry Materials) presents in a detailed manner the different preparation and shaping routes for these materials in the form of thin films, underlining the advantages and drawbacks of each, and focusing on the influence of many synthetic parameters and the mechanisms at play. In the same way, the scientific publication Boissiere et al. (*Aerosol Route to Functional Nanostructured Inorganic and Hybrid Porous Materials*, 2011, Advanced Materials) presents the different strategies that lead to obtaining mesostructured and/or mesoporous particles by combining sol-gel chemistry, self-assembly of surfactants and the aerosol spray method.

The solution described in the article by Jiang et al. (*Controlled Release from Core-Shell Nanoporous Silica Particles for Corrosion Inhibition of Aluminum Alloys*, 2011, Journal of Nanomaterials) to obtain particles loaded with corrosion inhibitors uses the EISA aerosol route and incorporation of corrosion inhibitors was achieved in a single step at the same time as the formation of mesostructured particles. However, the authors conducted a calcination step at 500° C. for five hours, which caused removal of the surfactants, degradation of the corrosion inhibitors and crystallization of the corrosion inhibitors. Such a step includes the drawback of not being compatible with either the incorporation of organic inhibitors or with the incorporation of inorganic inhibitors in molecular and/or non-oxide forms.

Another solution is presented in the articles by Shchukin et al. (*Surface-Modified Mesoporous $SiO_2$ Containers for Corrosion Protection*, 2009, Advanced Functional Materials; *Mesoporous Silica Nanoparticles for Active Corrosion Protection*, 2011, ACS Nano; *Influence of Embedded Nanocontainers on the Efficiency of Active Anticorrosive Coatings for Aluminum Alloys Part I: Influence of Nanocontainer Concentration*, 2012, ACS Applied Materials & Interfaces; *Influence of Embedded Nanocontainers on the Efficiency of Active Anticorrosive Coatings for Aluminum Alloys Part II: Influence of Nanocontainer Position*, 2013, ACS Applied Materials & Interfaces). However, the particles described in these articles are not mesostructured but are mesoporous. What is more, the development of particles loaded with corrosion inhibitors was achieved after a long (48 hours), multi-step synthesis process and post-treatments, a process that is difficult to see as compatible with industrial use. The particles described in these articles have been obtained by the classic precipitation pathway and not by the spraying of a solution. Finally, the mesoporous particles were loaded with corrosion inhibitors according to an iterative process of absorption in solution, which is a long, restrictive process that limits the load level and causes a large quantity of effluents that have to be reprocessed.

Mesostructured matrices have three distinct regions at the nanometric scale: (a) the inorganic and/or hybrid network, (b) the aqueous interface composed of M-OH/M-O$^-$ groups (where M is a metal or silicon), $H_2O$, and the polar surfactant heads, and (c) the hydrophobic core of micelle aggregates. Solubilization of functional molecules in mesostructured matrix is mainly governed by the following principle: "like dissolves like." This principle implies that a polar molecule is likely to be located either in the inorganic and/or hybrid network (as long as the hybrid portion is itself polar) or at the aqueous interface, and that a non-polar molecule is likely solubilized in the hydrophobic core of the micelle phase.

However, this principle is statistical and does not actually reflect the diffusion of molecules within mesostructured materials. Indeed, molecules can migrate from the hydrophobic portion of the micelles to the aqueous interface (and the reverse) as a function of the thermal stirring in the medium or chemical reactions (protonation-deprotonation). What is more, the diffusion of molecules is not only limited to the nanometric scale between these three regions but may occur in the mesostructure over a larger distance in a relatively short time (several tens of microns in a few minutes). Many parameters influence the diffusion of molecules in mesostructured materials such as size, load, the hydrophilic/hydrophobic balance of molecules, intra- or intermolecular interactions, the type of mesostructure (lamellar, 2D-hexagonal, vermicular, cubic), the pore size, whether surfactants are present or not, the nature of the surfactants (cationic, anionic or nonionic), the quantity of M-OH/M-O$^-$ at the interface, the quantity of water in the material, the nature of the surface of the pores (inorganic or organically modified), the interconnection between pores, how complex the network is, etc.

From these studies, the general behavior of how a molecule diffuses in a mesostructured material may be formulated: "the lower the interactions between the functional matrix and the molecule, the faster and more easily a molecule diffuses." Indeed, the diffusion of a molecule in a mesostructured matrix is not linear but consists in a succession of adsorption-desorption phases and diffusion phases. As an example, molecules solubilized in the surfactant phase (which can be assimilated in the solvent) diffuse faster than molecules interacting with adsorption sites on the surface of the inorganic portion. It is therefore easier for molecules to diffuse if the surface of the inorganic portion is passivated by inert functions on diffusing molecules.

A coating comprising mesostructured particles may be shaped by several different deposit techniques. The most well-known techniques are dip-coating, spin-coating, coil-coating and roll-coating, capillary-coating, doctor blade and spray-coating. Among all these techniques, the best that delivers an even coating from a weakly stable suspension, a coating in which the particles will be distributed statistically on the coating's entire thickness, is spray-coating, since homogeneity is an important parameter in terms of reproducibility, mechanical properties and anticorrosion activity. Spray coating also allows the deposit of coating on large parts and complex shapes.

OBJECT AND SUMMARY OF THE INVENTION

The present invention aims to remedy all or part of the drawbacks of the state of the art stated above.

To achieve this, the present invention relates, in a first feature, to a coating including at least one layer including individual and mesostructured spherical micrometric particles, said particles having been created and loaded with at least one element selected from functional corrosion-inhibiting molecules and functional corrosion-inhibiting nano-objects, by a method comprising non-dissociable nebulization-heating steps that are continuous in a single reactor. The presence of individual and mesostructured spherical micrometric particles allows retention of the mechanical and barrier properties of the host layer. The spherical mesostructured particles, regardless of their chemical nature, remain individual and do not form aggregates when dry or when they are dispersed in a matrix. Functional corrosion-inhibiting molecules and functional corrosion-inhibiting nano-objects must be understood as meaning any chemical species that can have active anticorrosion action and preferentially corrosion inhibitors, whether they are organic or inorganic, molecular, oligomers or aggregates. The method of creating and loading mesostructured particles in the coating that the present invention relates to comprises the following non-dissociable steps that are continuous and in a single reactor:

nebulization in a reactor of a liquid solution containing one or more precursors from the three-dimensional network of particles, at a given molar concentration in a solvent, so as to obtain a fog of solution droplets, the liquid solution further comprising at least one element chosen from functional corrosion-inhibiting molecules and functional nano-objects that inhibit corrosion, and optionally at least one surfactant, heating the fog to a so-called drying temperature that can ensure evaporation of the solvent and volatile compounds and the formation of particles, heating these particles to a temperature that can ensure the transformation of the precursor or precursors to form the inorganic portion of said network, optionally the densification of these particles, and the recovery of the resulting particles.

In embodiments, the layer including the spherical mesostructured particles is a sealed hybrid organic-inorganic layer containing sol-gel or a sealed primer layer (primer coat). This sealed layer has the advantage of providing a barrier property for anticorrosion protection. The spherical mesostructured particles have the role of providing the active property against corrosion through functional molecules and functional nano-objects.

In embodiments, the layer comprising the spherical mesostructured particles is a mesostructured matrix including at least one element selected from among functional corrosion-inhibiting molecules and functional corrosion-inhibiting nano-objects. This improves the active anticorrosion properties. The presence of double mesostructuration (matrix and particles) allows increased diffusion of functional molecules in the coating and therefore of heightened anticorrosion properties. What is more, since the matrix has the same chemical nature as the spherical mesostructured particles it makes incorporating spherical mesostructured particles in the matrix easier and does so without altering the matrix's macroscopic and microscopic properties.

In embodiments, the layer of mesostructured matrix is obtained from a suspension comprising at least one element selected from an inorganic precursor and a hybrid organic-inorganic precursor, in macromolecular form. Using inorganic and/or hybrid organic-inorganic precursors in macromolecular form, coupled with the use of acids generated by heat or light, allows the production of not only a more consolidated mesostructured matrix, therefore mechanically and chemically more stable, but also working with a solution containing less solvent, or even none. Such a method for obtaining a layer of mesostructured matrix comprises the following steps:

making a liquid solution including one or more precursors from the three-dimensional network of the mesostructured matrix, at a given molar concentration in at least one solvent, the liquid solution further comprising at least one surfactant and optionally at least one element chosen from functional corrosion-inhibiting molecules and functional nano-objects that inhibit corrosion, depositing the solution on a previously prepared substrate, after stirring and ageing the solution, where said deposit can be made by dip-coating or spray-coating, evaporating the solvent or solvents, followed by heat treating the substrate including the solution deposited at moderate temperature to ensure the transformation of the precursor or precursors to form the inorganic portion of said three-dimensional network of the mesostructured matrix.

In embodiments, the coatings comprising the mesostructured matrix comprise an upper sealed hybrid organic-inorganic layer comprising sol-gel or a sealed upper primer layer. This upper sealed layer provides the barrier property that limits the penetration of aggressive species to the substrate and the mesostructured matrix and the spherical mesostructured particles supply the active anticorrosion property through functional molecules and functional nano-objects.

In embodiments, the mesostructured matrix includes functional organosilanes bearing at least one group chosen from an amino group, a sulfide, a carboxyl and a thiol. This allows selective passivation at the surface of the intermetal particles of the substrate thanks to strong covalent or iono-covalent bonds, and in so doing, limiting the corrosion phenomenon.

In embodiments, the spherical mesostructured particles incorporated in the coatings have a diameter comprised between 0.1 and 10 micrometers. This characteristic favors their introduction in one layer of coating without changing the barrier properties. What is more, this characteristic is compatible with the incorporation of spherical mesostructured particles in a thin film (thickness of the order of a few microns).

In embodiments, the spherical mesostructured particles incorporated in the coating have a sphericity coefficient greater than or equal to 0.75.

In embodiments, the spherical mesostructured particles incorporated in the coatings present a mesostructure with segregation of organic and inorganic or hybrid organic-inorganic phases periodically organized with a periodicity, between the two phases, comprised between 2 and 50 nanometers.

In embodiments, the periodicity between the two phases is comprised between 2 and 15 nanometers.

According to another feature, the present invention targets the use of a coating that the present invention relates to, to protect light alloys in the aeronautic and aerospace fields.

Finally, according to another feature, the present invention targets an aircraft including a coating that the present invention relates to.

BRIEF DESCRIPTION OF THE DRAWINGS

The invention will be better understood upon reading the description that follows and examining the FIGURES that accompany it. These FIGURES are only given as illustration and in no way limit the invention.

FIG. 1 illustrates coatings including at least one layer comprising spherical micrometric, individual, and mesostructured particles, said particles having been, in a single step, created and loaded with at least one element selected from among functional molecules and functional nano-objects, according to embodiments of the invention.

DETAILED DESCRIPTION OF EMBODIMENTS OF THE INVENTION

FIG. 1 illustrates coatings 30 comprising at least one coat including spherical mesostructured particles 20 loaded with functional molecules and/or nano-objects. Spherical mesostructured particles 20 must be understood to mean any particle having organized and periodic segregation of phases at the mesoscopic scale, leading to the existence within said particles 20 of at least one three-dimensional network, that can be inorganic and advantageously contains hybrid organic-inorganic oxide(s), and where the other phases that can be purely organic advantageously contain micellar aggregates of hybrid organic-inorganic or inorganic surfactant molecules. The mesoscopic scale corresponds to a scale ranging from 2 to 50 nanometers.

Said mesostructured materials are prepared by the sol-gel route from at least one molecular metal precursor including one or more hydrolysable groups having formula (1), (2), (3) or (4) defined hereinbelow, in the presence of at least one particular texturing agent as defined hereinbelow, the texturing agent being stored in the final material. Said mesostructured materials are obtained in the form of films and/or in the form of spherical particles 20 as defined previously.

Hydrolysable group is understood to be a group that can react with water to give a —OH group, that will itself undergo polycondensation.

Said metallic molecular precursor including one or more hydrolysable groups is chosen from a metal alkoxide or halide, preferably a metal alkoxide, or an alkynyl metal having the formula:

$$MZ_n \quad (1),$$

$$L^m{}_xMZ_{n-mx} \quad (2),$$

$$R'_xSiZ_{4-x'} \quad (3), \text{ or}$$

$$Z_3Si-R''-SiZ_3 \quad (4)$$

formulas (1), (2), (3) and (4) in which:

M represents Al(III), Ce(III), Ce(IV), Si(IV), Zr(IV), the FIGURE between parentheses being the valence of the atom M;

n represents the valence of the atom M;

x is an integer ranging from 1 to n−1, x' is an integer ranging from 1 to 3;

Each Z, independently of each other, is chosen from a halogen atom and an —OR group, and preferably Z is a —OR group;

R represents an alkyl group comprising preferably 1 to 4 carbon atoms, such as a methyl, ethyl, n-propyl, i-propyl, n-butyl, s-butyl ort-butyl group, preferably methyl, ethyl or i-propyl, better still ethyl;

Each R' represents, independently of each other, a non-hydrolysable group chosen from alkyl groups, in particular $C_{1-4}$ alkyl groups, for example, methyl, ethyl, propyl or butyl; alkenyl groups particularly $C_{2-4}$ alkenyl groups, such as vinyl, 1-propenyl, 2-propenyl and butenyl; alkynyl groups particularly $C_{2-4}$ alkynyl, such as acetylenyl and propargyl; aryl groups particularly $C_{6-10}$ aryl, such as phenyl and naphthyl; methacryl or methacryloxy($C_{1-10}$ alkyl) groups such as methacryloxypropyl; epoxyalkyl or epoxyalkoxyalkyl groups in which the alkyl group is $C_{1-10}$ linear, branched or cyclic and the alkoxy group includes from 1 to 10 carbon atoms, such as ($C_{1-10}$ alkyl) glycidyl and glycidyloxy; $C_{2-10}$ halogenoalkyl groups such as 3-chloropropyl; $C_{2-10}$ perhalogenoalkyl groups such as perfluoropropyl; $C_{2-10}$ mercaptoalkyl groups such as mercaptopropyl; $C_{2-10}$ aminoalkyl groups such as 3-aminopropyl; ($C_{2-10}$ aminoalkyl)amino($C_{2-10}$ alkyl) groups such as 3-[(2-aminoethyl)amino]propyl; di($C_{2-10}$ alkylene)triamino($C_{2-10}$ alkyl) groups such as 3-[diethylenetriamino]propyl and imidazolyl-($C_{2-10}$ alkyl) groups;

L represents a complexing monodentate or polydentate ligand, preferably polydentate, for example, a carboxylic acid preferably a $C_{1-18}$ carboxylic acid, such as acetic acid, a β-diketone preferably a $C_{5-20}$ β-diketone, such as acetylacetone, a β-ketoester preferably a $C_{5-20}$ β-ketoester, such as methyl acetoacetate, a β-ketoamide preferably a $C_{5-20}$ β-ketoamide, such as a N-methylacetoacetamide, a α- or β-hydroxyacid preferably a $C_{3-20}$ α- or β-hydroxyacid, such as lactic acid or salicylic acid, an aminoacid such as alanine, a polyamine such as diethylenetriamine (or DETA), or phosphonic acid or a phosphonate;

m represents the hydroxylation index of ligand L; and

R" represents a non-hydrolyzable function chosen from alkylene groups preferably $C_{1-12}$ alkylene groups, for example, methylene, ethylene, propylene, butylene, hexylene, octylene, decylene and dodecylene; the alkynylene groups preferably $C_{1-12}$ alkynylene groups, for example acetylnylene (—C≡C—), —C≡C—C≡C—, and —C≡C—$C_6H_4$—C≡C—; N,N-di($C_{2-10}$ alkylene)amino groups such as N,N-diethyleneamino; bis[N,N-di($C_{2-10}$ alkylene)amino] groups such as bis[N-(3-propylene)-N-methyleneamino]; $C_{2-10}$ mercaptoalkylene such as mercaptopropylene; ($C_{2-10}$ alkylene)polysulfide groups such as propylene-disulfide or propylene-tetrasulfide; alkenylene groups particularly $C_{2-4}$ alkenylene groups such as vinylene; arylene groups particularly $C_{6-10}$ arylene, such as phenylene; di($C_{2-10}$ alkylene)-$C_{6-10}$ arylene groups, such as di(ethylene)phenylene; N,N'-di($C_{2-10}$ alkylene)ureido groups such as N,N'-dipropyleneureido; and the following groups:

like thiophenes such as

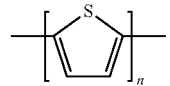

where n=1-4, like $C_{2-50}$ aliphatic and aryl (poly)ethers or (poly)thioethers, such as —$(CH_2)_p$—X—$(CH_2)_p$—, —$(CH_2)_p$—$C_6H_4$—X—$C_6H_4$—$(CH_2)_p$—, —$C_6H_4$—X—$C_6H_4$—, and —$[(CH_2)_p$—X$]_q(CH_2)_p$—, where X represents O or S, p=1-4 and q=2-10, like crown ethers such as

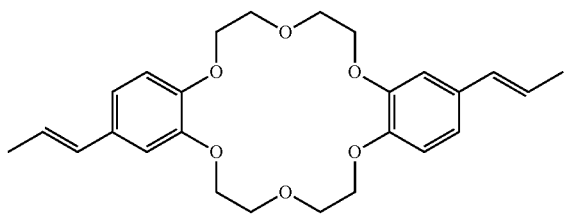 [SMILES: C/C=C/c1ccc2c(c1)OCCOCCOc1ccc(/C=C/C)cc1OCCOCCO2]

like organosilanes such as:

—$CH_2CH_2$—$SiMe_2$-$C_6H_4$—$SiMe_2$-$CH_2CH_2$—,

—$CH_2CH_2$—$SiMe_2$-$C_6H_4$—O—$C_6H_4$—$SiMe_2$-$CH_2CH_2$— and

—$CH_2CH_2$—$SiMe_2$-$C_2H_4$—$SiMe_2$-$CH_2CH_2$—, like $C_{1-18}$ fluoroalkylenes such as —$(CF_2)_r$— with r=1-10, —$CH_2CH_2$—$(CF_2)_6$—$CH_2CH_2$— and —$(CH_2)_4$—$(CF_2)_{10}$—$(CH_2)_4$—, like Viologen

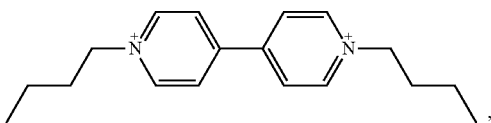

or even
like trans-1,2-bis(4-pyridylpropyl)ethene

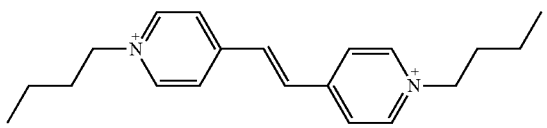

Preferably M is other than Si for formula (2).

As examples of compounds having formula (1), mention may be made of tetra($C_{1-4}$ alkoxy)silanes and zirconium n-propoxide $Zr(OCH_2CH_2CH_3)_4$.

As examples of compounds having formula (2), mention may be made in particular of:
di-s-butoxy-ethylacetoacetate-aluminum $(CH_3CH_2OC(O)CHC(O)CH_3)Al(CH_3CHOCH_2CH_3)_2$,
bis(2,4-pentanedionate)zirconium dichloride $[CH_3C(O)CHC(O)CH_3]_2ZrCl_2$, diispropoxy-bis(2,2,6,6-tetramethyl-3,5-heptanedionate)-zirconium $[(CH_3)_3CC(O)CHC(O)C(CH_3)_3]_2Zr[OCH(CH_3)_2]_2$.

As examples of organoalkoxysilane having formula (3), mention may in particular be made of 3-aminopropyltrialkoxysilane $(RO)_3Si—(CH_2)_3—NH_2$, 3-(2-aminoethyl) aminopropyltrialkoxysilane $(RO)_3Si—(CH_2)_3—NH—(CH_2)_2—NH_2$, 3-(trialkoxysilyl)propyldiethylenetriamine $(RO)_3Si—(CH_2)_3—NH—(CH_2)_2—NH—(CH_2)_2—NH_2$, 3-chloropropyltrialkoxysilane $(RO)_3Si—(CH_2)_3Cl$, 3-mercaptopropyltrialkoxysilane $(RO)_3Si—(CH_2)_3SH$, azole organosilyls like N-(3-trialkoxysilylpropyl)-4,5-dihydroimidazole, R having the same meaning as hereinabove.

As examples of bis-alkoxysilane having formula (4), preferably a bis-[trialkoxysilyl]methane $(RO)_3Si—CH_2—Si(OR)_3$, a bis-[trialkoxysilyl]ethane $(RO)_3Si—(CH_2)_2—Si(OR)_3$, a bis-[trialkoxysilyl]octane $(RO)_3Si—(CH_2)_8—Si(OR)_3$, a bis[trialkoxysilylpropyl]amine $(RO)_3Si—(CH_2)_3—NH—(CH_2)_3—Si(OR)_3$, a bis-[trialkoxysilylpropyl]ethylenediamine $(RO)_3Si—(CH_2)_3—NH—(CH_2)_2—NH—(CH_2)_3—Si(OR)_3$, a bis-[trialkoxysilylpropyl]disulfide $(RO)_3Si—(CH_2)_3—S_2—(CH_2)_3—Si(OR)_3$, a bis-[trialkoxysilylpropyl]tetrasulfide $(RO)_3Si—(CH_2)_3—S_4—(CH_2)_3—Si(OR)_3$, a bis-[trialkoxysilylpropyl]urea $(RO)_3Si—(CH_2)_3—NH—CO—NH—(CH_2)_3—Si(OR)_3$, a bis[trialkoxysilylethyl]phenyl $(RO)_3Si—(CH_2)_2—C_6H_4—(CH_2)_2—Si(OR)_3$ is used, R having the same meaning as hereinbefore.

For the present invention, organic-inorganic hybrid is understood to be a network formed of molecules corresponding to formulas (2), (3) or (4).

Surface functionalization of spherical mesostructured particles 20 through functional organosilanes (molecules corresponding to the formula (3)), can give these particles 20 absorption/trapping properties for aggressive species, in particular chloride ions, and better compatibility with the layer including the particles 20 in the case of polymer coatings.

The amphiphilic surfactant or surfactants that can be used in the invention as texturing agents are amphiphilic ionic surfactants such as anionic or cationic, amphoteric or zwitterionic, or nonionic surfactants, and that may further be photo- or thermo-polymerizable. This surfactant may be an amphiphilic molecule or a macromolecule (or polymer) that has an amphiphilic structure.

The anionic surfactants used preferably in the present invention are anionic amphiphilic molecules such as phosphates, for example $C_{12}H_{25}OPO_3H_2$, sulfates, for example $C_pH_{2p+1}OSO_3Na$ with p=12, 14, 16 or 18, sulfonates, for example $C_{16}H_{33}SO_3H$ and $C_{12}H_{25}C_6H_4SO_3Na$, and carboxylic acids, for example stearic acid $C_{17}H_{35}CO_2H$.

As examples of cationic amphiphilic surfactant, mention may in particular be made of quaternary ammonium salts such as those having formula (I) hereinbelow, or imidazolium or pyridinium or phosphonium salts.

Specific quaternary ammonium salts are in particular chosen from those having the following general formula (I):

in which groups $R_8$ to $R_{11}$ which may be the same or different, represent a linear or branched alkyl group including from 1 to 30 carbon atoms, and X represents a halogen atom such as a chlorine or bromine atom, or a sulfate.

Among quaternary ammonium salts having formula (I), mention may in particular be made of the tetraalkylammonium halides such as, for example, dialkyldimethylammonium or alkyltrimethylammonium halides in which the alkyl group includes about 12 to 22 carbon atoms, particularly behenyltrimethylammonium, distearyldimethylammonium, cetyltrimethylammonium, and benzyldimethylstearylammonium halides. Preferred halides are chlorides and bromides.

As examples of amphiphilic, amphoteric or zwitterionic surfactant, mention may in particular be made of amino acids such as propionic amino acids having formula $(R_{12})_3N^+—CH_2—CH_2—COO^-$ in which each $R_{12}$, the same or different, represents a hydrogen atom or a $C_{1-20}$ alkyl group such as dodecyl, and more particularly propionic dodecylamino acid.

Amphiphilic nonionic molecular surfactants that can be used in the present invention are preferably $C_{12-22}$ linear ethoxylated alcohols, including from 2 to 30 ethylene oxide units, or esters of fatty acids with 12 to 22 carbon atoms and sorbitan. Mention may in particular be made as examples those sold under the trade names BRIJ®, SPAN® and TWEEN® by the company Aldrich, and for example, BRIJ®C10 and 78, TWEEN® 20 and SPAN® 80.

Amphiphilic nonionic polymeric surfactants are all amphiphilic polymers having both hydrophilic and hydrophobic character. As examples of such copolymers, mention may be made in particular of:
fluorinated copolymers $CH_3—[CH_2—CH_2—CH_2—CH_2—O]_n—CO—R_1$ with $R_1=C_4F_9$ or $C_8F_{17}$,
biological copolymers such as the polyamino acids, for example, a polylysine and alginates,
dendrimers such as those described in G. J. A. A. Soler-Illia, L. Rozes, M. K. Boggiano, C. Sanchez, C. O. Turrin, A. M. Caminade, J. P. Majoral, Angew. Chem. Int. Ed. 2000, 39, No. 23, 4250-4254, and for example (S=)P[O—C$_6$H$_4$—CH=N—N(CH$_3$)—P(=S)—[O—C$_6$H$_4$—CH=CH—C(=O)—OH]$_2$]$_3$, block copolymers comprising two blocks, three A-B-A or A-B-C type blocks or four blocks, and any other amphiphilic copolymer known to the person skilled in the art, and more particularly those described in *Adv. Mater.*, S. Förster, M. Antonietti, 1998, 10, 195-217 or *Angew. Chem. Int.*, S. Förster, T. Plantenberg, Ed, 2002, 41, 688-714, or *Macromol. Rapid Commun*, H. Cölfen, 2001, 22, 219-252.

Preferably, in the scope of the present invention an amphiphilic block copolymer is chosen from a poly(methacrylic acid) copolymer, a polydiene copolymer, a hydrogenated diene copolymer, a poly(propylene oxide) copolymer, poly(ethylene oxide) copolymers, polyisobutylene copolymers, a polystyrene copolymer, a polysiloxane copolymer, a poly(2-vinyl-naphthalene) copolymer, a poly(vinyl pyridine and N-methyl vinylpyridinium) iodide copolymer and a poly(vinylpyrrolidone) copolymer.

Preferentially a block copolymer formed of poly(alkylene oxide) chains is used, each block being formed of a poly(alkylene oxide) chain, the alkylene including a different number of carbon atoms depending on each chain.

For example, a copolymer with two blocks, one of the two blocks is formed of a hydrophilic poly(alkylene oxide) chain and the other block is formed of a hydrophobic poly(alkylene oxide) chain. For a three block copolymer, two of the blocks are hydrophilic while the other block, located between the two hydrophilic blocks, is hydrophobic. Preferably, in the case of a three block copolymer, the hydrophilic poly(alkylene oxide) chains are poly(ethylene oxide) chains denoted (POE)$_u$ and (POE)$_w$ and the hydrophobic poly(alkylene oxide) chains are poly(propylene oxide) chains denoted (POP), or poly(butylene oxide) chains, or mixed chains in which each chain is a mixture of several alkylene oxide monomers. For a three block copolymer, a compound having formula (POE)$_u$-(POP)$_v$-(POE)$_w$ with $5<u<106$, $33<v<70$ and $5<w<106$ can be used. As an example, PLURONIC® P123 ($u=w=20$ and $v=70$) or PLURONIC® F127 ($u=w=106$ and $v=70$) are used, these products being sold by the company BASF or Aldrich.

Functional molecules and nano-objects must be understood as meaning any chemical species that can have active anticorrosion action and preferentially corrosion inhibitors, whether they are organic or inorganic, molecular, oligomers or aggregates.

The inorganic functional molecules and functional nano-objects having anticorrosion action are chosen from corrosion inhibitors comprising rare earths such as cerium, neodymium (III), praseodymium (III) salts and/or molybdates, vanadates, tungstates, phosphates, Co(III), Mn(VII) salts. For example, they are chosen from CeCl$_3$, Ce(NO$_3$)$_3$, Ce$_2$(SO$_4$)$_3$, Ce(CH$_3$CO$_2$)$_3$, Ce$_2$(MoO$_4$)$_3$, Na$_2$MoO$_4$NaVO$_3$, NaWO$_4$-3WO$_3$, Sr—Al-polyphosphate, zinc phosphate, KH$_2$PO$_4$, Na$_3$PO$_4$, YCl$_3$, LaCl$_3$, Ce(IO$_3$)$_3$, or from particles of magnesium or molybdenum, and nanoparticles of silica or alumina, zirconium oxide, BaB$_2$O$_4$, Na$_2$SiO$_3$, Na$_2$MnO$_4$; cerium oxide, praseodymium oxide, silica oxide, antimony-tin oxide, barium sulfate, zinc nitroisophthalate, organo-philized calcium strontium phosphosilicate, zinc molybdate and modified aluminum polyphosphate.

Organic functional molecules and functional nano-objects having anticorrosion action are chosen from agents like azoles, amines, mercaptans, carboxylates and phosphonates; benzotriazole, 2-mercaptobenzothiazole, mercaptobenzimidazole, sodium benzoate, nitrochlorobenzene, chloranyl, 8-hydroxyquinoline, N-methylpyridine, piperidine, piperazine, 1,2-aminoethylpiperidine, N-2-aminoethylpiperazine, N-methylphenothiazine, β-cyclodextrin, imidazole and pyridine, 2,4-pentanedionate, 2,5-dimercapto,1,3,4-thiadiazole (DMTD), N,N-diethyl-dithiocarbamate (DEDTC), 1-pyrrolydine-dithiocarbamate (PDTC) the agents formed of a molecule of anthracene bearing imidazolium groups; methyl orange and phenolphthalein; rhodamine, fluorescein, quinizarin, methylene blue and ethylviolet.

Said spherical mesostructured particles 20, through the choice of inorganic and/or hybrid organic-inorganic precursors (organosilanes bearing one or more non-hydrolyzable functions) and thanks to the presence of a extended surfactant phase behaving as a liquid phase, present one time-controlled release of functional molecules and/or nano-objects (fast to slow, the duration depending on the composition of particles 20). The method for synthesizing spherical mesostructured particles 20 is a spray drying method. More precisely, the method of synthesizing particles 20 consists in spraying a solution containing the solvent(s) and the non-volatile compounds (inorganic and/or hybrid organic-inorganic precursors, surfactants, anticorrosion agents). Once the solution is prepared, it is sprayed, according to a pneumatic or piezoelectric method, in the form of fine droplets that are transported via a carrier gas (air) in a drying zone whose temperature is below 400° C., optionally using a temperature gradient for example of 40 to 400° C. in a time interval from 1 to 30 seconds, such as in particular illustrated in the examples. The self-organization process for surfactants in the mesophase and that of condensation of inorganic and/or hybrid organic-inorganic precursors occurs in this drying zone. The time droplets/particles spend in the drying zone is of the order of a few seconds (from 1 to 30 seconds). Particles 20 are then gathered in a filter.

The spherical mesostructured particles 20, regardless of their chemical nature, remain individual and do not form aggregates when dry or when they are dispersed in a matrix. Preferably, a particle 20 is not formed by the aggregation of several smaller particles 20. An ensemble of particles 20 may optionally temporarily contain particles 20 that do not meet this characteristic, in so far as the criterion for non-aggregation is respected by at least 50% by number of particles 20 of the whole. Preferably, at least 60%, at least 70%, at least 80%, at least 90%, at least 95% by number of particles 20 of the whole considered are individual.

Mesostructured particles 20 are spherical, i.e. they have a sphericity coefficient greater than or equal to 0.75. Preferably, the sphericity coefficient is greater than or equal to 0.8, greater than or equal to 0.85, greater than or equal to 0.9, or even greater than or equal to 0.95. The sphericity coefficient for a particle 20 is the ratio of the smallest diameter of the particle 20 to the its largest diameter. For a perfect sphere, this ratio is 1. At least 50% by number of particles 20 have sphericity as defined hereinbefore. Preferably, at least 60%, at least 70%, at least 80%, at least 90%, at least 95% by number of particles 20 of the whole considered have sphericity as defined herein before.

The diameter of particles 20 is comprised between 0.1 and 10 micrometers. The diameter of micelles 21 of spherical mesostructured particles 20 is of the order of 2 to 15 nanometers.

Preferably, the particles 20 according to the invention are individual non-deformable particles.

The synthesis of the coating 30 that the invention relates to occurs through a succession of the following steps: a first step consists in synthesizing spherical, micrometric, individual and mesostructured particles 20, said particles being, in a single step, created and loaded with at least one element selected from among functional molecules and functional nano-objects. A second step corresponds to the development of a suspension 22 comprising reagents composing the layer including the spherical mesostructured particles 20, and the spherical mesostructured particles 20 themselves. In a third step, said heterogeneous suspension 22 is deposited by a spray-coating, dip-layering or spin-layering technique on a substrate 31 prepared previously or on a conversion layer 32.

Finally, in a fourth step, a treatment for deposited coating 30 is made with at least one treatment chosen from a heat treatment and a treatment with UV-visible irradiation.

The layer including the spherical, mesostructured particles 20 may have a different nature according to the embodiments of the invention. In embodiments illustrated by FIG. 1, the layer including the spherical mesostructured particles 20 is a dense hybrid organic-inorganic layer 33 containing sol-gel or a dense primer layer 33 (primer coat). Dense layer is understood to mean a layer that has no mesostructuration, a layer that is closed and sealed to the exterior environment and that has barrier properties to electrolytes. Therefore, here dense layer is understood to mean a sealed layer. Said layer is therefore impermeable and does not let liquids, gases, dust or moisture pass. In other embodiments also illustrated by FIG. 1, the layer comprising spherical mesostructured particles 20 is a mesostructured matrix 35 including molecules and/or functional nano-objects such as those defined previously. The mesostructured matrix 35 is covered by a dense hybrid organic-inorganic upper layer 34 containing sol-gel or a dense upper primer layer 34.

Functional molecules and/or nano-objects are confined in micelle aggregates 21 organized to form a mesostructure within particles 20 and the matrix 35 in which the micelle aggregates 21 are trapped.

The mesostructured matrix 35 is a hybrid organic-inorganic matrix. Hybrid organic-inorganic is understood to mean the same definition as that given previously for the hybrid organic-inorganic network of spherical, mesostructured particles 20. The hybrid organic-inorganic mesostructured matrix 35 allows the coating 30 to adhere to the lower layers such as metallic substrates via metal-O—Si or Si—O—Si bonds, and boosts good adhesion of the upper layers (primer or paint) by organic bonds obtained thanks to using hybrid organic-inorganic coupling agents, such as functional organosilanes (formula 3). What is more, via the addition of hybrid organic-inorganic molecules like functional organosilanes bearing one or more amino, sulfide, carboxyl or thiol groups, the mesostructured matrix 35 allows selective passivation from the surface of the intermetallic particles of the substrate thanks to strong covalent or ionocovalent bonds, limiting the corrosion phenomenon in this way.

In addition, the inorganic portion provides good scratch-resistance and extended lifetime whereas the organic portion increases the flexibility of coating 30. In doing so, mesostructured matrix 35 produces coatings without cracks and can incorporate submicron or micron particles 20 within it more easily, and without altering the macroscopic and microscopic properties of said mesostructured matrix 35. What is more, as the mesostructured matrix 35 is chemically of the same nature as the spherical mesostructured particles 20, this facilitates the integration of said spherical mesostructured particles 20 in coating 30. The chemical nature of spherical mesostructured particles 20, totally compatible with that of mesostructured matrix 35 of coating 30, can modulate the force of bonds between particles 20 and mesostructured matrix 35 to produce a coating 30 that presents improved mechanical and barrier properties.

EXAMPLES AND PROTOCOLS

The following experimental protocol and examples are in no way limiting in terms of the embodiments of the invention.

The following experimental examples in which a BÜCHI® B290 device is used are conducted at temperatures below those necessary for pyrolysis (decomposition by heat) of the various chemical constituents.

Example 1: Synthesis of Submicron Mesostructured Particles Loaded with Benzotriazole (BTA)-Sol-Gel Catalyst Hydrochloric Acid (HCl) Conducted with Büchi® B-290 Spray-Dryer In an 80-mL polypropylene vial, the following compounds are added in order and with magnetic stirring (500 rpm): 6.54 g of tetraethoxysilane (TEOS), 14.47 g of absolute ethanol (EtOH), 16.95 g of a 0.1 N aqueous hydrochloric acid solution (HCl). The solution is then maintained with stirring at 25° C. for 24-72 hours. After ageing, 1.29 g of polyethylene glycol hexadecylether (BRIJ®C10) and 0.75 g of BTA are added to the solution. Alternatively, 5.73 g of TEOS, 12.68 g EtOH, 19.81 g of a 0.1 N aqueous hydrochloric acid solution (HCl) are added in order and with stirring. The solution is then maintained with stirring at 25° C. for 24 hours. After ageing, 1.13 g of BRIJ®C10 and 0.66 g of BTA are added to the solution. Alternatively, 5.10 g of TEOS, 11.28 g EtOH, 22.03 g of a 0.1 N aqueous hydrochloric acid solution (HCl) are added in order and with stirring. The solution is then maintained with stirring at 25° C. for 24 hours. After ageing, 1.00 g of BRIJ®C10 and 0.58 g of BTA are added to the solution. The mixture is then maintained with stirring at ambient temperature (25° C.) until a clear solution is obtained (i.e. about fifteen minutes). The solution is then sprayed into micrometric droplets in a flow of hot gas (air) using a single tip-nozzle that has an opening with diameter 0.7 mm. The circulation flow rate for the solution was set at 0.34 L h$^{-1}$. The compressed air flow rate for spraying was set at 357 L h$^{-1}$. The air circulation for aspiration of sprayed droplets was set so as to maintain positive pressure of 3×10$^3$ Pa before the filter. These conditions correspond to the time spent in the spray tube of around 3 s. The temperature setting at the spray-dryer input was set at 140° C. and the outlet temperature observed was 75° C. The resulting particles that are recovered on the filter are then maintained in an oven at 60° C. for 48 hours then they are stored sealed in a polypropylene vial at ambient temperature.

Example 2: Synthesis of Submicron Mesostructured Particles Loaded with Benzotriazole (BTA)-Sol-Gel Catalyst Acetic Acid (AcOH) Conducted with BÜCHI® B-290 Spray-Dryer In an 80-mL polypropylene vial, the following compounds are added in order and with magnetic stirring (500 rpm): 5.30 g of TEOS, 18.35 g of a of a 0.1 N aqueous AcOH solution. The solution is then maintained with stirring at 25° C. for 24 hours. After ageing, 1.00 g of BRIJ®C10 is dissolved in a mixture formed of 2 g of H$_2$O and 3 g of EtOH, where heating to 37° C. for 5 minutes can be employed to boost dissolution of the BRIJ®C10 in the water-alcohol solution, then the two solutions are mixed with stirring. Finally, 0.3 g of BTA is added to the solution. Alternatively, 5.30 g of TEOS, 27.50 g of a 0.1 N aqueous AcOH solution are added in order and with stirring. The solution is then maintained with stirring at 25° C. for 24 hours. After ageing, 0.90 g of BRIJ®C10 is dissolved in 5 g of EtOH, where heating to 40° C. for 15 minutes can be employed to boost dissolution of the BRIJ®C10, then the two solutions are mixed with stirring. Finally, 0.3 g of BTA is added to the solution. Alternatively, 5.24 g of TEOS, 13.50 g of a 0.1 N aqueous AcOH solution are added in order and with stirring. The solution is then maintained with stirring at 25° C. for 24 hours. After ageing, 0.90 g of BRIJ®C10 is dissolved in 5 g of EtOH, where heating to 40° C. for 15 minutes can be employed to boost dissolution of the BRIJ®C10, then the two solutions are mixed with stirring. Finally, 0.3 g of BTA is added to the solution. Alternatively, 5.30 g of TEOS, 18.35 g of a 0.1 N aqueous AcOH solution are added in order and with stirring. The solution is then maintained with stirring at 25° C. for 24 hours. After ageing, 0.46 g of BRIJ®C10 is dissolved in a mixture formed of 2 g of $H_2O$ and 3 g of EtOH, where heating to 37° C. for 5 minutes can be employed to boost dissolution of the BRIJ®C10 in the water-alcohol solution, then the two solutions are mixed with stirring. Finally, 0.9 g of BTA is added to the solution. The mixture is then maintained with stirring at 40° C. for 5 minutes. The solution is then sprayed into micrometric droplets in a flow of hot gas (air) using a single tip-nozzle that has an opening with diameter 0.7 mm. The circulation flow rate for the solution was set at 0.34 L·h$^{-1}$. The compressed air flow rate for spraying was set at 357 L h$^{-1}$. The air circulation for aspiration of sprayed droplets was set so as to maintain positive pressure of $3\times10^3$ Pa before the filter. These conditions correspond to the times spent in the spray tube of around 3 s. The temperature setting at the input of the spray-dryer was set at 160° C. and at the outlet temperature observed was 90° C. The resulting particles that are recovered on the filter are then maintained in an oven at 60° C. for 48 hours then they are stored sealed in a polypropylene vial at ambient temperature.

Example 3: Synthesis of Submicron Mesostructured Particles Loaded with 8-Hydroxyquinoline (8-HQ)-Sol-Gel Catalyst Hydrochloric Acid (HCl) Conducted with BÜCHI® B-290 Spray-Dryer In an 80-mL polypropylene vial, the following compounds are added in order and with magnetic stirring (500 rpm): 6.94 g of TEOS, 7.68 g of EtOH, 24.00 g of a 0.1 N aqueous HCl solution and 1.37 g of BRIJ®C10. The solution is then maintained with stirring at 25° C. for 48 hours. 1.45 g of 8-HQ are dissolved in 25 mL of a 0.1 N aqueous HCl solution. The two solutions are then mixed and sprayed. Alternatively, 9.96 g of TEOS, 25.03 g of a 0.1 N aqueous HCl solution are added in order and the solution is maintained with stirring at 25° C. for 48 hours. After aging, 0.85 g of MTEOS is added to the solution. The solution is then stirred for 6 hours at 25° C. 1.54 g of BRIJ®C10 is dissolved in a water-alcohol mixture composed of 5 g of EtOH and 3 g of $H_2O$. The two solutions are then mixed and maintained with stirring. To this mixture, 1.39 g of 8-HQ is added and quickly 0.8 g of 37 mass % concentrated HCl. The solution is then maintained with stirring for 5 minutes before spray-drying. Spraying into micrometric droplets is then achieved in a flow of hot gas (air) using a single tip-nozzle that has an opening with diameter 0.7 mm. The circulation flow rate for the solution was set at 0.34 L h$^{-1}$. The compressed air flow rate for spraying was set at 357 L The air circulation for aspiration of sprayed droplets was set so as to maintain positive pressure of $3\times10^3$ Pa before the filter. These conditions correspond to the time spent in the spray tube of around 3 s. The temperature setting at the input of the spray-dryer was set at 160° C. and at the outlet the temperature observed was 90° C. The resulting particles that are recovered on the filter are then maintained in an oven at 60° C. for 48 hours then they are stored sealed in a polypropylene vial at ambient temperature.

Example 4: Synthesis of Submicron Mesostructured Particles Loaded with Cerium (Ce) (III) Acetate-Sol-Gel Catalyst Hydrochloric Acid (HCl) Conducted with BÜCHI® B-290 Spray-Dryer In an 80-mL polypropylene vial, the following compounds are added in order and with magnetic stirring (500 rpm): 4.00 g of TEOS, 9.85 g of EtOH, 24.22 g of a 0.1 N aqueous HCl solution. The solution is then maintained with stirring at 25° C. for 42 hours. After aging, 0.38 g of methyltriethoxysilane (MTEOS) is added to the solution. The solution is then stirred for 6 hours at 25° C. Then 0.88 g of BRIJ®C10 then 0.68 g of Ce(III) are dissolved in the solution. Alternatively, 3.56 g of TEOS, 9.85 g EtOH, 24.18 g of a 0.1 N aqueous hydrochloric acid solution (HCl) are added in order and with stirring. The solution is then maintained with stirring at 25° C. for 48 hours. After aging, 0.76 g of MTEOS is added to the solution. The solution is then stirred for 6 hours at 25° C. Then 0.88 g of BRIJ®C10 then 0.68 g of Ce(III) are dissolved in the solution. Alternatively, 4.44 g of TEOS, 24.18 g of a 0.1 N aqueous HCl solution are added in order and with stirring. The solution is then maintained with stirring at 25° C. for 48 hours. After ageing, 0.88 g of BRIJ®C10 and 0.68 g of Ce(III) are dissolved in the solution. The solution is then sprayed into micrometric droplets in a flow of hot gas (air) using a single tip-nozzle that has an opening with diameter 0.7 mm. The circulation flow rate for the solution was set at 0.34 Lh$^{-1}$. The compressed air flow rate for spraying was set at 357 L h$^{-1}$. The air circulation for aspiration of sprayed droplets was set so as to maintain positive pressure of $3.10^3$ Pa before the filter. These conditions correspond to the time spent in the spray tube of around 3 s. The temperature setting at the input of the spray-dryer was set at 140° C. and at the outlet the temperature observed was 80° C. The resulting particles that are recovered on the filter are then maintained in an oven at 60° C. for 48 hours then they are stored sealed in a polypropylene vial at ambient temperature. Examples 1 to 4: Characterizations of mesostructured particles obtained with the BÜCHI® B-290 spray-dryer.

The particles are characterized both on the powder dried in the oven at 60° C. (scanning electron microscopy–SEM/X-ray diffraction–XRD/thermogravimetric analysis–TGA) and after a calcination step in air at 550° C. for 8 h (scanning electron microscopy–SEM/Transmission electron microscopy–TEM/nitrogen volumetry/X-ray diffraction). These materials present a vermicular mesostructure (TEM), a correlation peak at low angles (XRD), an average diameter centered around 900 nm (SEM), a specific surface area after calcination of the order of 500 m$^2$g$^{-1}$ (nitrogen volumetry) and pore diameter of 2.5 nm.

Example 5: Preparation of Micron Mesostructured Particles Loaded with Benzotriazole (BTA)-Sol-Gel Acetic Acid Catalyst (AcOH)

Preparation of the solution: In a polypropylene vial, the following compounds are added in order and with magnetic stirring: 27.5 g of an aqueous solution of AcOH at 0.1 M and 5.30 g of TEOS (i.e. 1.5 g of silica). The solution is then maintained with stirring at 25° C. for 24 hours to allow hydrolysis-condensation of the TEOS. After ageing, 0.53 g of BRIJ®C10 is dissolved in 5.82 g of ethanol, where heating to 37° C. for 5 minutes can be employed to boost dissolution of the BRIJ®C10 in the water-alcohol solution, then this solution is mixed with the precursor silica solution. Finally, 0.31 g of BTA powder is added to the solution.

The silica/Brij/BTA precursor solution is nebulized by the pyrolysis spray method in a reactor to obtain a fog of droplets of solution.

In the same reactor comprising the following non-dissociable and continuous steps, the fog is then heated to a temperature called the drying temperature that can ensure solvent evaporation and particle formation. The particles then undergo a heating step at a temperature called the pyrolysis temperature to ensure the transformation of the precursor or precursors to form the inorganic portion of the three-dimensional network of particles. The maximum temperature for the oven in which the drying and pyrolysis steps occur is set at 150° C. to preserve the surfactant and anticorrosion agent.

The particles are recovered directly on a filter and optionally dried in air.

Example 6: Mesostructured Coating with Mesostructured Particles

Successively, to 143.8 g of EtOH, 12.6 g Milli-Q $H_2O$, 2.3 g of 37 mass % concentrated HCl, 8.77 g of polyoxyethylene (20)cetylether (BRIJ®58) and 32.5 g of TEOS were added with stirring. The solution is then maintained with stirring at 25° C. for 24 hours. After ageing, 3.6 g of mesostructured particles described in examples 1 to 4, are added with stirring and/or sonication to the solution. Moreover, a substrate made of unplated alloy AA 2024 T3 has been prepared, with dimensions 120*80*1.6 mm, according to methodology known to the person skilled in the art, such as alkaline degreasing followed by acidic chemical stripping, having a formulation compatible with environmental regulations. The suspension (mixture of solution—mesostructured particles) is then deposited on the metallic substrate using a pneumatic gravity-fed spray gun, with the air pressure set at about 0.7 bar. The surface is well covered in a manner identical to applying a primer or paint, then after a period of a few minutes to 1 hour, the samples are placed in the oven set at 70° C. After 30 minutes, the samples are removed and left to cool.

Example 7: Dense Hybrid Organic-Inorganic Coating with Mesostructured Particles In a 200-mL beaker, the following compounds are added in order and with magnetic stirring (500 rpm): 21.6 g of a solution of zirconium(IV) propoxide at 70 mass % and 10 g of glacial acetic acid. After homogenization, 124.4 g of Milli-Q $H_2O$ is added with stirring. The solution is maintained with stirring for about 1 hour until a homogeneous and limpid solution is obtained. To 136 g of this solution, 44 g of (3-glycidoxypropyl)trimethoxysilane is added with stirring. The stirring is maintained for about 1 hour until a homogeneous and clear solution is obtained. To 153 g of this last mixture, 1.85 g of mesostructured particles described in examples 1 to 4 are added with stirring and/or sonication. Moreover, a substrate made of unplated alloy AA 2024 T3 has been prepared, with dimensions 120*80*1.6 mm, according to methodology known to the person skilled in the art, such as alkaline degreasing followed by acidic chemical stripping, having a formulation compatible with environmental regulations. The suspension (mixture of solution—mesostructured particles) is then deposited on the metallic substrate using a pneumatic gravity-fed spray gun. The surface is well covered in a manner identical to applying a primer or paint, then after a period of a few minutes to 1 hour, the samples are placed in the oven set at 110° C. After 30 minutes, the samples are removed and left to cool.

Example 8: A Dense Hybrid Organic-Inorganic Coating Containing Polymers Containing the Mesostructured Particles To 108.3 g of a commercial polyurethane varnish (AvioxClearcoat AKZO) prepared according to the manufacturer's recommendations, are added 3.4 g of mesostructured particles described in examples 1 to 4, with stirring and/or sonication. Moreover, a substrate made of unplated alloy AA 2024 T3 has been prepared, with dimensions 120*80*1.6 mm, according to methodology known to the person skilled in the art, such as alkaline degreasing followed by acidic chemical stripping, having a formulation compatible with environmental regulations. The suspension (mixture of varnish—mesostructured particles) is then deposited on the metallic substrate using a pneumatic gravity-fed spray gun. The surface is well covered in a manner identical to applying a primer or paint, then after a period of a few minutes to 1 hour, the samples are placed in the oven set at 110° C. After 30 minutes, the samples are removed and left to cool.

The invention claimed is:

1. A coating comprising at least one layer comprising individual and mesostructured spherical micrometric particles, said mesostructured spherical micrometric particles being loaded with at least one element selected from among functional corrosion-inhibiting molecules and functional corrosion-inhibiting nano-objects and formed by a continuous non-dissociable nebulization of a liquid solution at a predetermined molar concentration in a solvent to obtain a fog of solution droplets and heating the fog solution droplets to evaporate the solvent and volatile compounds in a single reactor, the liquid solution comprising one or more precursors from a three-dimensional network of particles and said at least one element chosen from the functional corrosion-inhibiting molecules and the functional corrosion-inhibiting nano-objects; and wherein said at least one layer is a sealed hybrid organic-inorganic layer, containing a sol-gel or sealed primer layer, that is closed and sealed to limit penetration of corrosive materials.

2. The coating as claimed in claim 1, wherein said at least one layer is a mesostructured matrix comprising said at least one element selected from among the functional corrosion-inhibiting molecules and the functional corrosion-inhibiting nano-objects.

3. The coating as claimed in claim 2, wherein the mesostructured matrix is obtained from a suspension comprising at least one element selected from an inorganic precursor and a hybrid organic-inorganic precursor, in macromolecular form.

4. The coating as claimed in claim 2, further comprising a sealed upper hybrid organic-inorganic layer comprising sol-gel or an upper sealed primer layer.

5. The coating as claimed in claim 2, wherein the mesostructured matrix comprises functional organosilanes bearing at least one group selected from an amino group, a sulfide, a carboxyl and a thiol.

6. The coating as claimed in claim 1, wherein the mesostructured spherical micrometric particles incorporated in the coating have a diameter between 0.1 and 10 micrometers.

7. The coating as claimed in claim 1, wherein the mesostructured spherical micrometric particles incorporated in the coating have a sphericity coefficient greater than or equal to 0.75.

8. The coating as claimed in claim 1, wherein the mesostructured spherical micrometric particles incorporated in the coating present a mesostructure with segregation of organic and inorganic or hybrid organic-inorganic phases periodically organized with a periodicity, between the two phases, between 2 and 50 nanometers.

9. The coating as claimed in claim 8, wherein the periodicity between the two phases is between 2 and 15 nanometers.

10. The coating as claimed claim 1 is applied to protect light alloys in aeronautic and aerospace fields.

11. An aircraft comprising a coating as claimed in claim 1.

12. The coating as claimed in 1, wherein an inorganic portion of the sealed hybrid organic-inorganic layer provides scratch resistance to the coating and an organic portion of the sealed hybrid organic-inorganic layer increases flexibility of the coating.

* * * * *